US008640316B2

(12) United States Patent
Gentner et al.

(10) Patent No.: US 8,640,316 B2
(45) Date of Patent: Feb. 4, 2014

(54) INTERCHANGING METHOD AND APPARATUS FOR A BRAKE PISTON COMPRESSOR

(75) Inventors: Adam Gentner, Huntington Beach, CA (US); Ray de Schepper, Norwalk, CA (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 415 days.

(21) Appl. No.: 13/028,776

(22) Filed: Feb. 16, 2011

(65) Prior Publication Data

US 2012/0204393 A1 Aug. 16, 2012

(51) Int. Cl.
*B23P 19/04* (2006.01)

(52) U.S. Cl.
USPC .............................................. 29/257; 29/239

(58) Field of Classification Search
USPC ............ 269/3, 6, 143, 249; 29/239, 700, 257, 29/278, 225, 221, 235
See application file for complete search history.

(56) References Cited

U.S. PATENT DOCUMENTS

| | | | | |
|---|---|---|---|---|
| 3,499,206 | A * | 3/1970 | Quernheim | 29/239 |
| 4,308,661 | A * | 1/1982 | Hallstrom, Jr. | 29/764 |
| 4,809,567 | A * | 3/1989 | Bongard | 81/485 |
| 5,988,616 | A * | 11/1999 | Fuller et al. | 269/6 |
| 6,029,331 | A * | 2/2000 | Simmons | 29/239 |
| 6,029,964 | A * | 2/2000 | Bohl | 269/6 |
| 6,196,536 | B1 * | 3/2001 | Hintze | 269/282 |
| 7,387,296 | B2 * | 6/2008 | Alberti | 269/249 |
| 2003/0218289 | A1 * | 11/2003 | Hermann | 269/204 |
| 2004/0123438 | A1 * | 7/2004 | Kang | 29/239 |
| 2010/0283193 | A1 * | 11/2010 | Huang | 267/140.2 |
| 2012/0151727 | A1 * | 6/2012 | Dewell | 29/237 |

* cited by examiner

*Primary Examiner* — Monica Carter

*Assistant Examiner* — Nirvana Deonauth

(74) *Attorney, Agent, or Firm* — Baker & Hostetler LLP

(57) ABSTRACT

A brake piston compressor is provided. The brake piston compressor includes: two blocks; a forcing screw configured to engage the blocks to selectively bring the blocks closer together or farther apart from each other depending upon which way the forcing screw is turned; two pads each pad configured to be slidably engaged with at least one block; and a locking mechanism configured to engage and disengage to lock one of the pads to one of the blocks when the locking mechanism is engaged. A method of operating a brake piston compressor is provided. The method includes: sliding a pad into a channel in a block; locking the pad to the block; and turning a forcing screw to move the pad and block with respect to a second pad and block.

17 Claims, 6 Drawing Sheets

INTERCHANGING METHOD AND APPARATUS FOR A BRAKE PISTON COMPRESSOR

FIELD OF THE INVENTION

The present invention relates generally to a tool used for maintaining vehicle brakes. More particularly, the present invention relates to a brake piston compressor and an apparatus and method for making pads interchangeable on a brake piston compressor.

BACKGROUND OF THE INVENTION

Brake systems on automobiles need to be serviced from time to time. Modern automobiles commonly have disc brakes on the front two wheels. Some models have disc brakes on all four wheels. Common maintenance conducted on disc brakes include changing the brake pads and/or rotors.

A common step taken during maintenance of disc brakes includes compressing the brake piston. Various piston compressors are available in the art. Different manufactures have different sized or configured brake pistons and indeed some manufactures may have different sized or configured brake pistons on various automobiles.

It is cumbersome and expensive to have an individual brake piston spreader for each size caliber associated with various models of automobiles. For example, the Lexus LFA and IS-F have very large brake calibers and pads, however, they also have dramatically different sizes between them. Rather than requiring a mechanic to have multiple tools in order to work on various brake calibers. It would be desirable to have a tool that could be adapted to work on various different brake systems.

Accordingly, it is desirable to provide a method and apparatus that can be used on various models having different sized brake calipers and pads.

SUMMARY OF THE INVENTION

The foregoing needs are met, to a great extent, by the present invention, wherein in one aspect an apparatus is provided that in some embodiments a method and an apparatus adaptable for various brake systems is provided. The apparatus is adaptable so that it can be used on various brake systems.

In accordance with one embodiment of the present invention, a brake piston compressor is provided. The brake piston compressor includes: two blocks; a forcing screw configured to engage the blocks to selectively bring the blocks closer together or farther apart from each other depending upon which way the forcing screw is turned; two pads each pad configured to be slidably engaged with at least one block; and a locking mechanism configured to engage and disengage to lock one of the pads to one of the blocks when the locking mechanism is engaged.

In accordance with another embodiment of the present invention, a method of operating a brake piston compressor is provided. The method includes: sliding a pad into a channel in a block; locking the pad to the block; and turning a forcing screw to move the pad and block with respect to a second pad and block.

In accordance with yet another embodiment of the present invention a brake piston compressor is provided. The brake piston compressor includes: two blocks; a means for forcing configured to engage the blocks to selectively bring the blocks closer together or farther apart from each other depending upon which way the means for forcing is actuated; two pads each pad configured to be slidably engaged with at least one block; and a means for locking configured engage and disengage to lock one of the pads to one of the blocks when the means for locking is engaged.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
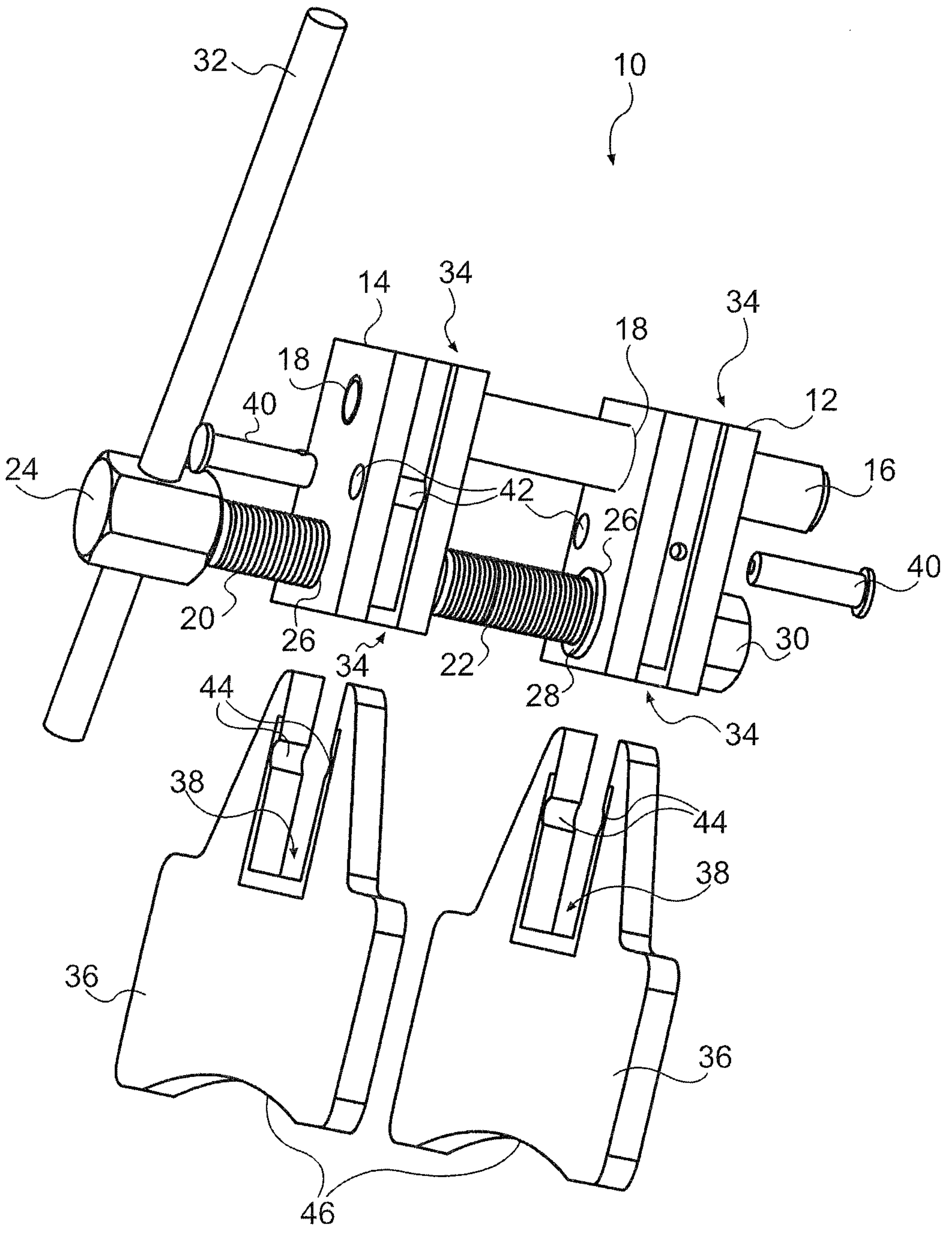
FIG. 1 is an exploded view of a brake piston compressor in accordance with the embodiment of the invention.

The invention will now be described with reference to the drawing figures, in which like reference numerals refer to like parts throughout. An embodiment in accordance with the present invention provides a brake piston compressor 10. The brake piston compressor 10 has interchangeable pads which allow the brake piston compressor to be used with a large variety of model vehicles and brake systems. By the simple removal and exchange of the pads to pads that are compatible with a specific brake system, a single brake system compressor can be adapted to be used for the brake systems in large variety of vehicles.

FIG. 1 is an exploded view of a brake piston compressor 10 in accordance with an embodiment of the invention. The brake piston compressor 10 includes two blocks 12 and 14. A guide pin 16 is used to connect the blocks 12 and 14 together. The guide pin 16 fits in guide pin holes 18 found in both blocks 12 and 14.

A forcing screw 20 is also used to connect the blocks 12 and 14 together. The forcing screw 20 has threads 22 and, in some embodiments of the invention, a hex shaped head 24. The forcing screw 20 fits into forcing screw holes 26 found in the blocks 12 and 14. In some embodiments one or both of the forcing screw holes 26 may include threads that interact or communicate with the threads 22 on the forcing screw 20. By turning the forcing screw one way or the other, the interaction of the threads 22 on the forcing screw 20 and threads within one or both of the forcing screw holes 26 cause the blocks 12 and 14 to move closer together or farther apart.

In some embodiments, and as shown, a forcing screw nut 30 may be placed at the end of the forcing screw 20. In some embodiments of the invention, the forcing screw holes 26 are not threaded but may move along forcing screw 20. The interaction between the forcing screw 20 and one or more forcing screw nuts 30 cause the blocks 12 and 14 to move closer to each other in these embodiments. In other embodiments of the invention, one of the blocks such as for example block 14, may have threaded forcing screw holes 26 and the other block for example block 12 may not have a threaded forcing screw hole 26, but rather a smooth forcing screw hole, such that the forcing screw nut 30 and the forcing screw 20 interact to cause the blocks 12 and 14 to move closer to each other or farther apart, depending on which way a forcing screw 20 is turned. One of ordinary skilled in the art can appreciate various configurations of threading various holes or using nuts to achieve a desired result.

The guide pin 16 acts as a guide to keep the blocks 12 and 14 oriented at a desired orientation with respect to each other. However, the blocks 12 and 14 can move axially along the guide pin 16 as the forcing screw 20 is turned.

A thrust washer 28 may also be placed on the forcing screw 20 adjacent to one of the blocks 12 or 14. Multiple washers 28 may be used in some embodiments.

As shown in FIG. 1, the forcing screw 20 also includes a turn bar 32. Turn bar 32 may be used by a user to gain additional leverage in order to turn the forcing screw 20.

Blocks 12 and 14 have U-shaped channels 34. In some embodiments of the invention the blocks 12 and 14 have U-shaped channels 34 on three sides of the blocks 12, 14, as can be seen by comparing the various views shown in FIG. 1-6. The U-shaped channels 34 provide a place for the pads 36 to slide onto the blocks 12 and 14 and be held by the blocks 12 and 14 in a somewhat secure manner.

The pads 36 have receiving channels 38 into which the blocks 12 and 14 fit. The pads 36 may be locked onto the blocks 12 and 14 by a retaining pin 40. A retaining pin 40 fits into retaining pin holes 42 located on the blocks 12 and 14 and retaining pin slot 44 located in the receiving channels 38 of the pads 36. Thus, when the retaining pin 40 is removed from the blocks 12 and 14, the pads 36 are free to slide on and off the blocks 12 and 14. However, when the pads 36 are fit onto the blocks 12 and 14, the retaining pin slots 44 are aligned with the retaining pin holes 42. The retaining pin 40 is passed through the retaining pin holes 42 and the retaining pin slots 44, thereby, locking the pads 36 onto the blocks 12 and 14.

When it is desired to change pads 36 the retaining pin 40 is simply removed and the pads 36 are removed from the blocks 12 and 14. Different size pads 36 may then be slid onto the blocks 12 and 14 and locked to the blocks 12 and 14 by use of the retaining pin 40. One of ordinary skill in the art would understand that other locking mechanisms may be used to lock the pads 36 to the blocks 12 and 14. One of ordinary skill in the art would also understand that it may be desirable to lock the pad 36 to the blocks 12 and 14 in a manner such that the pads 36 can be easily unlocked and removed from the blocks 12 and 14 as desired.

The pads 36 may be of different sizes as will be discussed further below. Different sets of pads 36 may have different geometry to accolade various brake systems. For example, the bottom of the pad 36 may include a curved surface 46 which may be useful in connecting the pads to a vehicle's rotor curvature.

Figure 2:
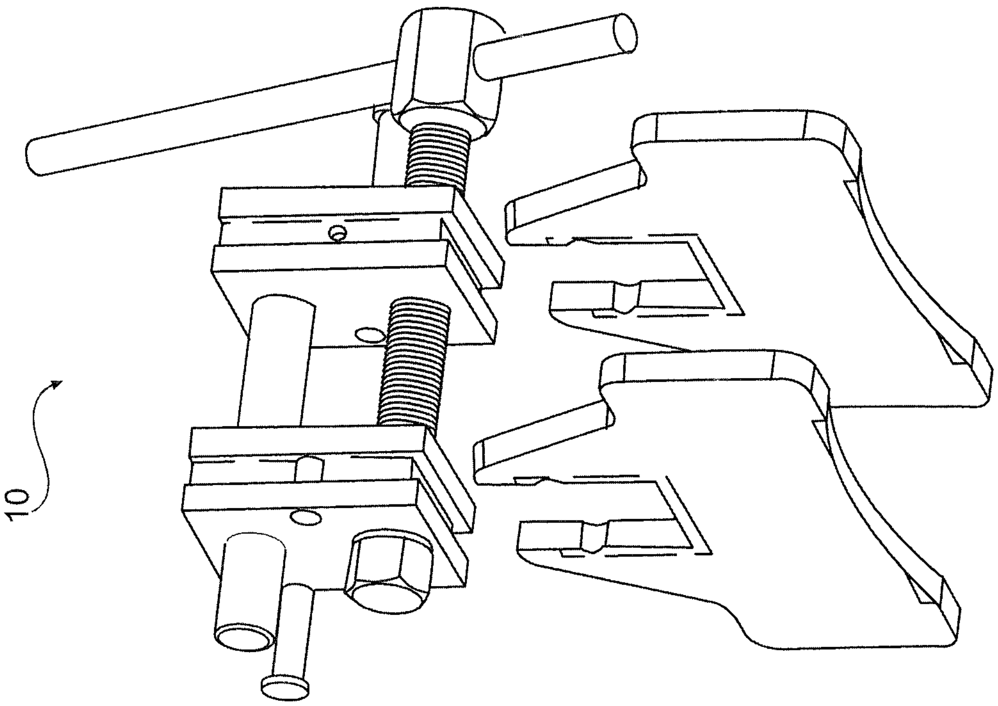
FIG. 2 is an exploded view of a brake piston compressor taken from a different angle than that shown in FIG. 1.

FIG. 2 is an exploded view of the brake piston compressor 10 shown from a different angle than that shown in FIG. 1. The angle shown in FIG. 2 shows the back side of the brake piston compressor 10.

Figure 3:
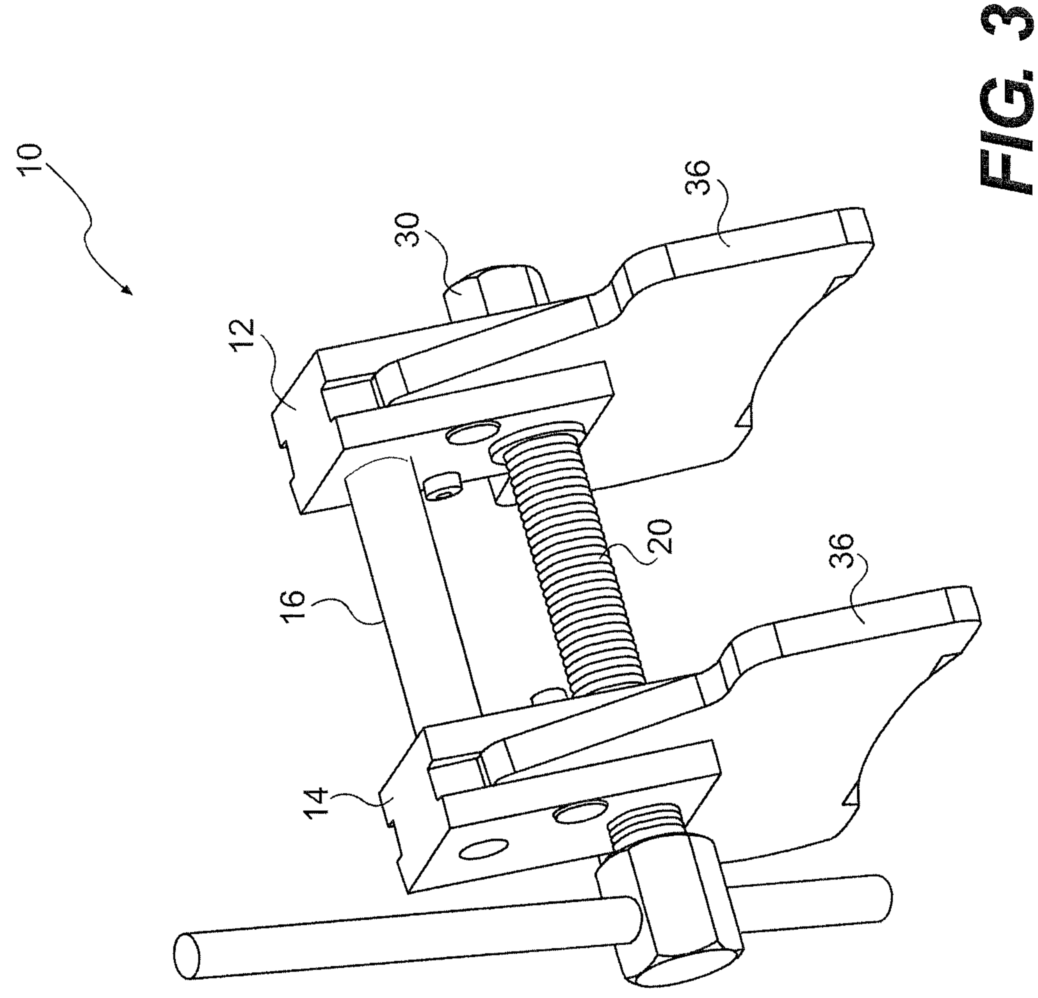
FIG. 3 is an assembled view of a brake piston compressor.

FIG. 3 is an assembled view of the brake piston compressor 10, showing the guide pin 16 and the pads 36 connected to the blocks 12 and 14. The forcing screw 20 is also shown connected to the blocks 12 and 14 and the forcing screw nut 30.

Figure 4:
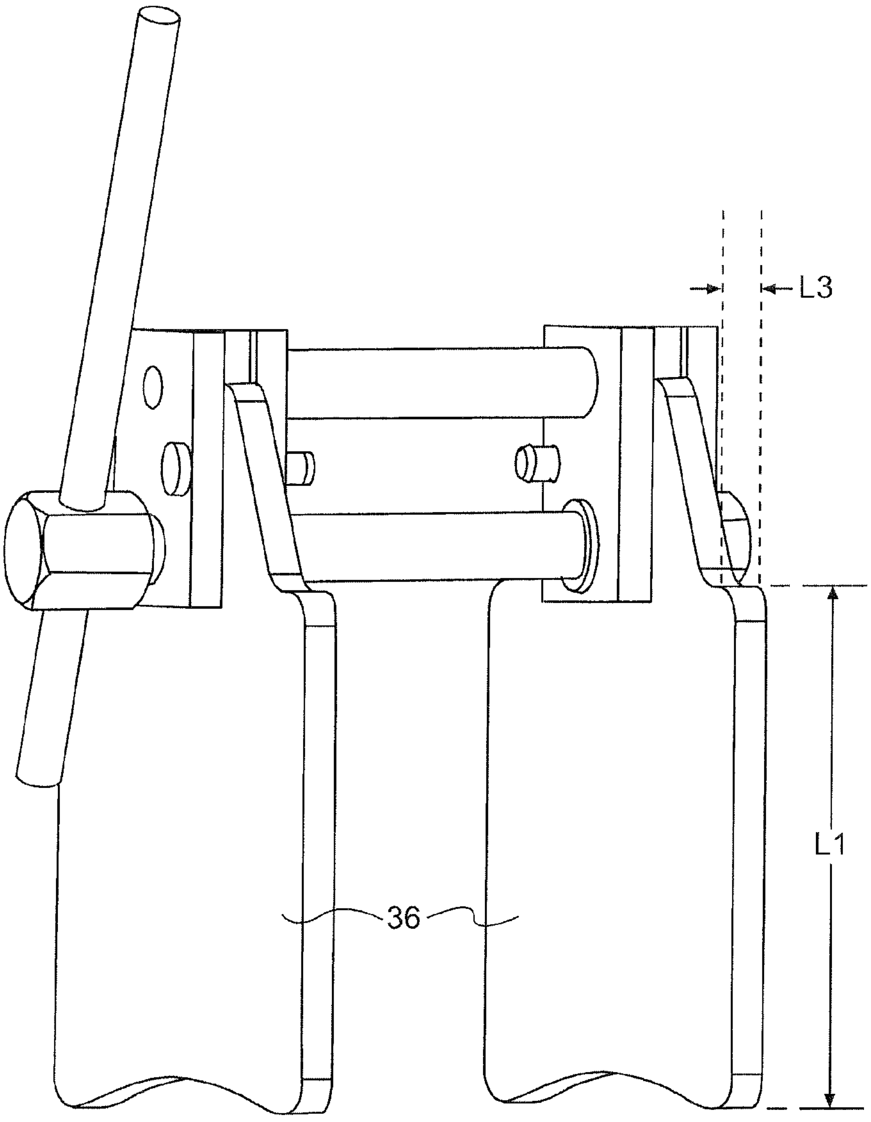
FIG. 4 is an assembled view of a brake piston compressor taken from a different angle than that shown in FIG. 3.
Figure 5:
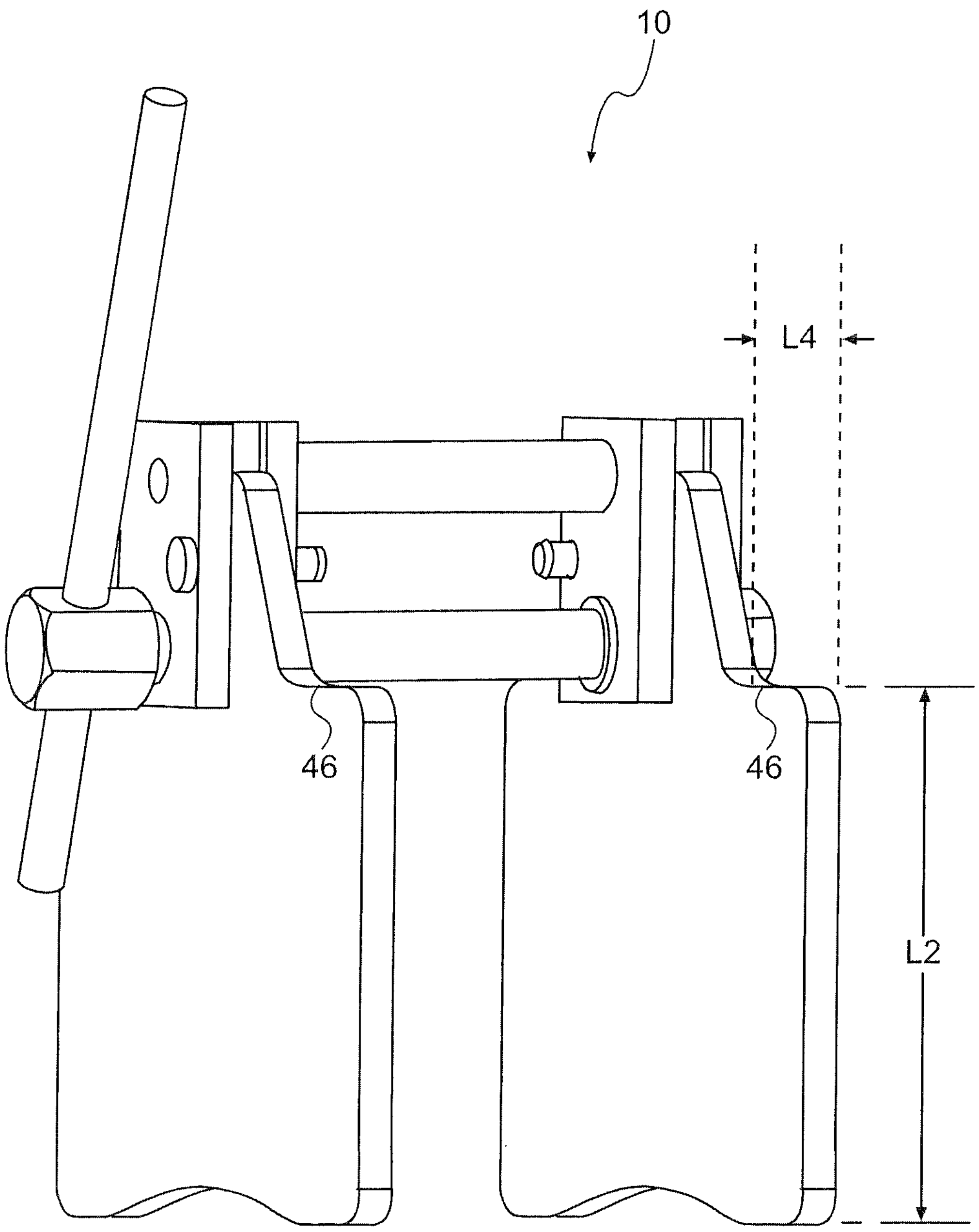
FIG. 5 is an assembled view of a brake piston compressor taken from a different angle than that shown in FIGS. 3 and 4.

FIGS. 4 and 5 provide examples of various sets of pads 36 that may have different dimensions and lengths. For example, the length L1 is shown in FIG. 4 is different than the length L2 shown in FIG. 5. Length L3 shown in FIG. 4 is different than the length L4 shown in FIG. 5. These different dimensions are sample examples of various dimensions that may occur between different pads 36 that are used for servicing different brake systems. Other dimensions may also vary from various sets of pads 36. Various sets of pads 36 may also have different shapes and geometries.

Figure 6:
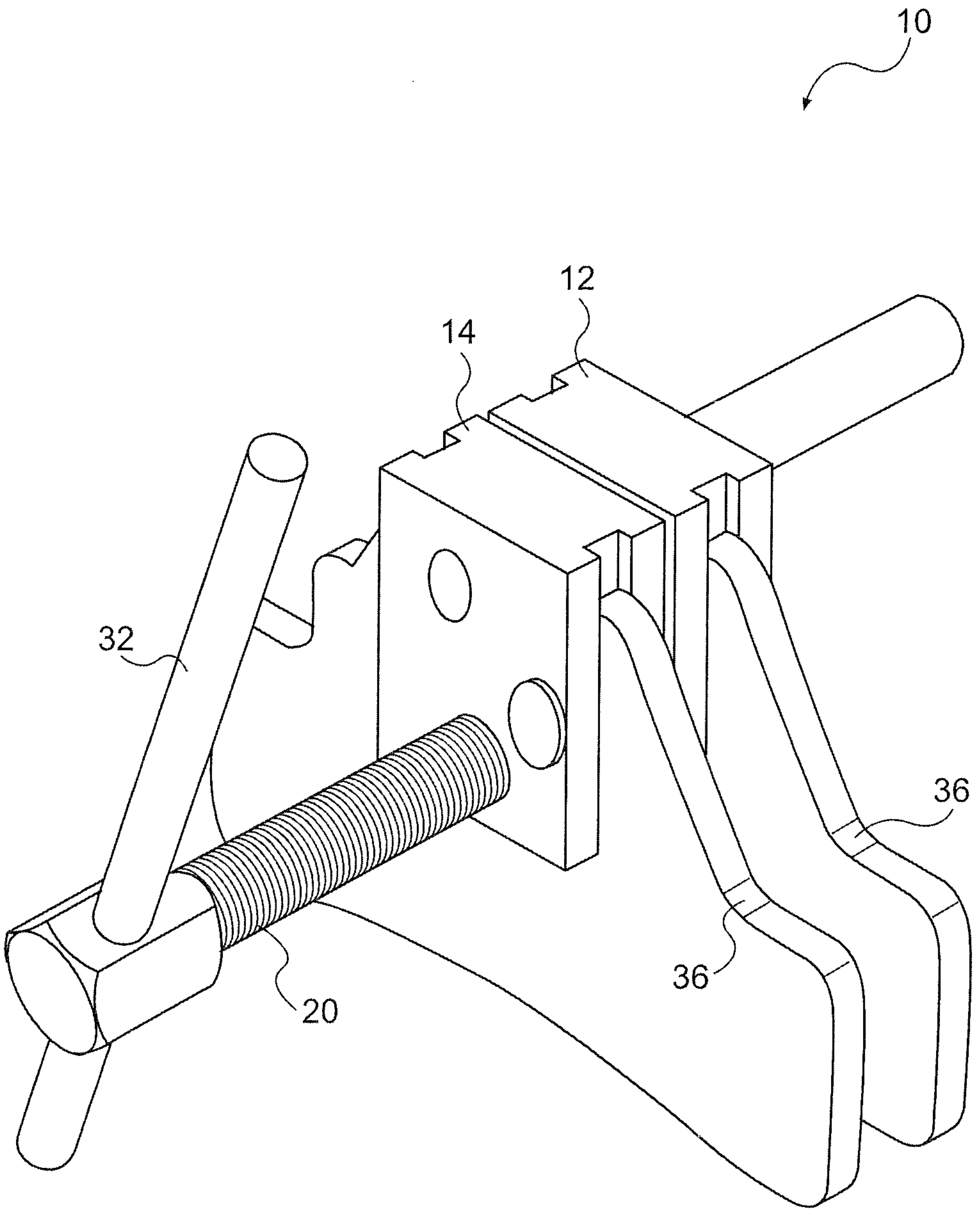
FIG. 6 is an assembled view of a brake piston compressor in a closed position and taken from a different angle than those shown in FIGS. 3-5.

FIG. 6 is an example of a brake piston compressor 10 shown in a closed position. As shown, the blocks 12 and 14 are located near each other and the movement of the blocks 12 and 14 has caused the pads 36 to also move near each other. As stated above, the pads 36 and blocks 12 and 14 can be moved closer or near to each other by actuation of the turn bar 32 and/or forcing screw 20.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A brake piston compressor, comprising:
two blocks;
a forcing screw configured to engage the blocks to selectively bring the blocks closer together or farther apart from each other depending upon which way the forcing screw is turned;
a turn bar configured to extend through the forcing screw and provide a handle for turning the forcing screw;
two pads each pad configured to be slidably engaged with at least one block; and
a locking mechanism configured to engage and disengage to lock one of the pads to one of the blocks when the locking mechanism is engaged, wherein each block has U-shaped channels on three sides.

2. The brake piston compressor of claim 1, wherein each block has U-shaped channels in which the pads slidably engage the blocks.

3. The brake piston compressor of claim 1, wherein the locking mechanism includes a pin configured to extend into a hole in the block and a notch in the pad thereby locking the pad to the block.

4. The brake piston compressor of claim 1, further comprising a guide pin connecting the blocks to each other and extending substantially parallel to the forcing screw.

5. The brake piston compressor of claim 1, wherein the pads are substantially flat shaped.

6. The brake piston compressor of claim 5, further including a curved surface in an edge of the pads opposite an edge that engages the blocks.

7. The brake piston compressor of claim 5, further including at least one additional set of pads having at least one of a different length and width as the pads but substantially the same thickness as the pads at the place where the pads engage the blocks.

8. The brake piston compressor of claim 1, further comprising a forcing screw nut and wherein the forcing screw has a hex shaped head and the blocks are located between the head and the nut.

9. A method of operating a brake piston compressor, comprising:

sliding a first pad into a channel in a first block;

locking the first pad to the first block;

turning a forcing screw to move the first pad and first block with respect to a second pad and a second block; and spreading a brake piston with the first and second pads.

10. The method of claim 9, wherein the locking step includes sliding a pin through a hole in the first block and a notch in the first pad.

11. The method of claim 9 wherein the turning step includes rotating a turn bar connected to the forcing screw.

12. The method of claim 9, further comprising removing the first and second pads from the blocks and sliding a second set of pads onto the blocks wherein the second set of pads have different dimensions than the first and second pads.

13. The method of claim 9, further comprising sliding the first pad into three channels in the first block.

14. The method of claim 9, further comprising turning the forcing screw with a hex tool.

15. The method of claim 9, further comprising manipulating a nut on the forcing screw.

16. The method of claim 15, wherein the manipulating is done with a hex tool.

17. A brake piston compressor comprising:

two blocks;

means for forcing configured to engage the blocks to selectively bring the blocks closer together or farther apart from each other depending upon which way the means for forcing is actuated;

means for turning configured to extend through the means for forcing and provide a handle for turning the means for forcing;

two pads each pad configured to be slidably engaged with at least one block; and means for locking configured engage and disengage to lock one of the pads to one of the blocks when the means for locking is engaged, wherein each block has U-shaped channels on three sides.

* * * * *